(12) United States Patent
Radulescu (10) Patent No.: US 6,488,064 B1
(45) Date of Patent: Dec. 3, 2002

(54) SACRIFICIAL RIBS FOR IMPROVED TIRE WEAR

(75) Inventor: Robert Ciprian Radulescu, Perignat les Sarlieve (FR)

(73) Assignee: Michelin Recherche et Technique, S.A. (CH)

( * ) Notice: Subject to any disclaimer, the term of this patent is extended or adjusted under 35 U.S.C. 154(b) by 0 days.

(21) Appl. No.: 09/333,463

(22) Filed: Jun. 15, 1999

Related U.S. Application Data (63) Continuation of application No. PCT/US97/23934, filed on Dec. 19, 1997
(60) Provisional application No. 60/034,301, filed on Dec. 19, 1996.

(51) Int. Cl.⁷ .......................... B60C 11/04; B60C 11/12; B60C 105/00
(52) U.S. Cl. .......................... 152/209.14; 152/209.16; 152/209.18; 152/209.27; 152/901; 152/DIG. 3
(58) Field of Search ................ 152/209.14, 209.16, 152/209.18, 209.27, DIG. 3, 901

(56) References Cited

U.S. PATENT DOCUMENTS

| | | | |
|---|---|---|---|
| 2,272,879 A | | 2/1942 | Hargraves .................. 152/209 |
| 4,480,671 A | | 11/1984 | Giron ..................... 152/209 R |
| 4,836,257 A | * | 6/1989 | Mamada et al. ........ 152/209.16 |
| 4,890,658 A | | 1/1990 | Kabe et al. ............. 152/209 D |
| 4,993,466 A | * | 2/1991 | Ochiai .................... 152/209.16 |
| 5,522,442 A | * | 6/1996 | Kishi ..................... 152/209.16 |
| 5,660,652 A | * | 8/1997 | Young et al. ........... 152/209.16 |
| 5,769,978 A | * | 6/1998 | Lurois ................... 152/209.16 |
| 5,921,303 A | * | 7/1999 | Matsumoto ............ 152/209.16 |
| 6,196,288 B1 | | 3/2001 | Radulescu |

FOREIGN PATENT DOCUMENTS

| | | |
|---|---|---|
| EP | EP 0 427 417 A2 | 5/1991 |
| EP | EP 0 427 543 A3 | 5/1991 |
| FR | EP 0 384 182 A1 | 8/1990 |
| FR | WO 92/02380 | 2/1992 |
| GB | GB 532 534 | 1/1941 |
| GB | GB 2 190 048 A | 11/1987 |
| JP | JP 03 007604 | 1/1991 |
| JP | JP 03 253 408 | 11/1991 |
| JP | JP 03 273 908 | 12/1991 |
| JP | JP 05 338 418 | 12/1993 |
| WO | WO 98/26945 | * 6/1998 |

* cited by examiner

*Primary Examiner*—Steven D. Maki
(74) *Attorney, Agent, or Firm*—E. Martin Remick; Martin Farrell; Alan A. Csontos (57) ABSTRACT

The present invention provides a tire with a sacrificial rib to protect the main ribs of the tire's tread by delaying the onset of irregular wear and the growth thereof. The improved tire tread comprises a plurality of main ribs formed by grooves extending generally circumferentially around an outer surface of the tire to form a main tread width for contacting the supporting surface. A sacrificial rib is provided for contacting the supporting surface at each lateral side of the main ribs. The sacrificial rib is separated from the main ribs by a narrow shoulder groove having a groove width not greater than about 1.5 millimeter. The sacrificial rib has a surface width in the range of about 2.5 percent to about 12 percent of said tread width. The sacrificial rib has a recess defined by a radial offset from a transverse or lateral profile of the main ribs. The offset has a value in the range of about 0.50 millimeter to about 2.0 millimeters when the tire is new. A shape factor is used for defining the shape of the sacrificial rib where the shape factor has a value between about 0.10 and 0.50.

16 Claims, 12 Drawing Sheets

Fig. 1

PRIOR ART

SACRIFICIAL RIBS FOR IMPROVED TIRE WEAR

This application claims the benefit of U.S. Provisional Application No. 60/034,301, filed Dec. 19, 1996 and is a continuation of International Application No. PCT/US97/23934, filed Dec. 19, 1997.

BACKGROUND OF THE INVENTION

This invention relates to vehicle tires, and more particularly to heavy duty truck tires. The invention is particularly useful with long haul trucking operations in reducing the irregular wear of front axle tires.

The problem of irregular wear in long haul truck tires is well known in the art. Truck tires that experience straight ahead driving for a large portion of their life develop wear patterns which are different. Tire stresses from turning and maneuvering the vehicle only exist for a limited time compared with tire stresses from straight ahead highway driving. The axle alignment of the truck as well as compliance of truck suspension and steering linkages become much more important in producing tire wear. Normal stresses can also become as important as the longitudinal and lateral stresses in producing tire wear.

Those patents which disclose various solutions for the problem of irregular wear and endurance in steer axle truck tires include U.S. Pat. Nos. 4,214,618; 4,480,671; 4,890,658; 5,010,936; 5,099,899 and 5,131,444, French Patent No. 2,303,675 (FR675), British Patent No. 2,027,649 (GB649), Japanese Patent No. 3-253408 (JP408) and PCT Patent Application No. 9202380-A (PCT380). These references disclose means to control the shape of a shoulder area of a tire's tread in an effort to limit the onset of irregular changes in the tread shape as the tire wears (i.e. railway wear). The use of shoulder grooves of various sizes and at various locations where the contact area of the tread transitions into the shoulder area is disclosed. However, none of these references disclose a shoulder rib that will reduce the stresses on the first interior rib to delay the onset and reduce the growth of irregular wear over a substantial portion of the life of the tire's tread.

The use of narrow shoulder ribs on the front steer axle truck tire to control wear on the main circumferential ribs is known in the art. The general problem with the teachings of the art is characterized by the fact that relatively narrow shoulder ribs and narrow grooves separating the narrow shoulder rib from the first interior rib is only effective when the tire is relatively new. The narrow shoulder ribs quickly wear producing and a relatively large recess so that the narrow shoulder rib does not carry a large enough portion of the tire load after initial wear is experienced. This problem is not solved with either no initial recess or a large initial recess as the shoulder rib of the tire develops its own stable recess magnitude during the initial wearing process. To improve rib wear and endurance of the tire the use of wider shoulder ribs and somewhat narrower grooves have been disclosed in Australian Patent No. 622983 (AU983), PCT Application No. 9202380-A (PCT380) and Japanese Patent No. 2-253408 (JP408). These references are discussed in more detail in the following paragraphs.

The Australian Patent AU983 discloses a tire for vehicles traveling long distances at sustained speed with medium to high loads on the tire. The wear life of the tread is improved by including narrow shoulder grooves having a width of 3.5 millimeters, wide shoulder ribs each having a width at least 13 percent of the total contact width and a shoulder rib recess having a value between 0.5 and 5.0 millimeters. The disclosed shoulder rib width is relatively large; being at least 35 millimeters for a tire with a main tread width of 200 millimeters.

In the PCT application PCT380 a truck tire is disclosed for long runs at sustained speeds which has increased resistance to separation between the layers of subtread reinforcement. Resistance to separation is improved by a narrow shoulder grooves having a width between 0.6 and 8 millimeters, wide shoulder ribs having a width between 17 and 34 millimeters and a shoulder rib recess having a value of less than 40 percent of the depth of the main tread grooves. Once again the shoulder rib width is relatively large and the preferred recess is also relatively large.

The Japanese Patent JP408 discloses a tire with reduced shoulder abrasion and gravel biting. Resistance to abrasion is realized by including thin narrow shoulder grooves with a groove width from 0.2 to 3 percent of the main tread width, the shoulder ribs have a width greater than 90 percent of the main groove depth of the main tread portion with a sloping contact surface area between 20 and 60 degrees, but the patent is silent about the magnitude of the shoulder rib recess. The sloping contact surface area of the shoulder rib is at least 20 degrees to help prevent gravel biting as well as groove cracking and tearing.

Figure 1:
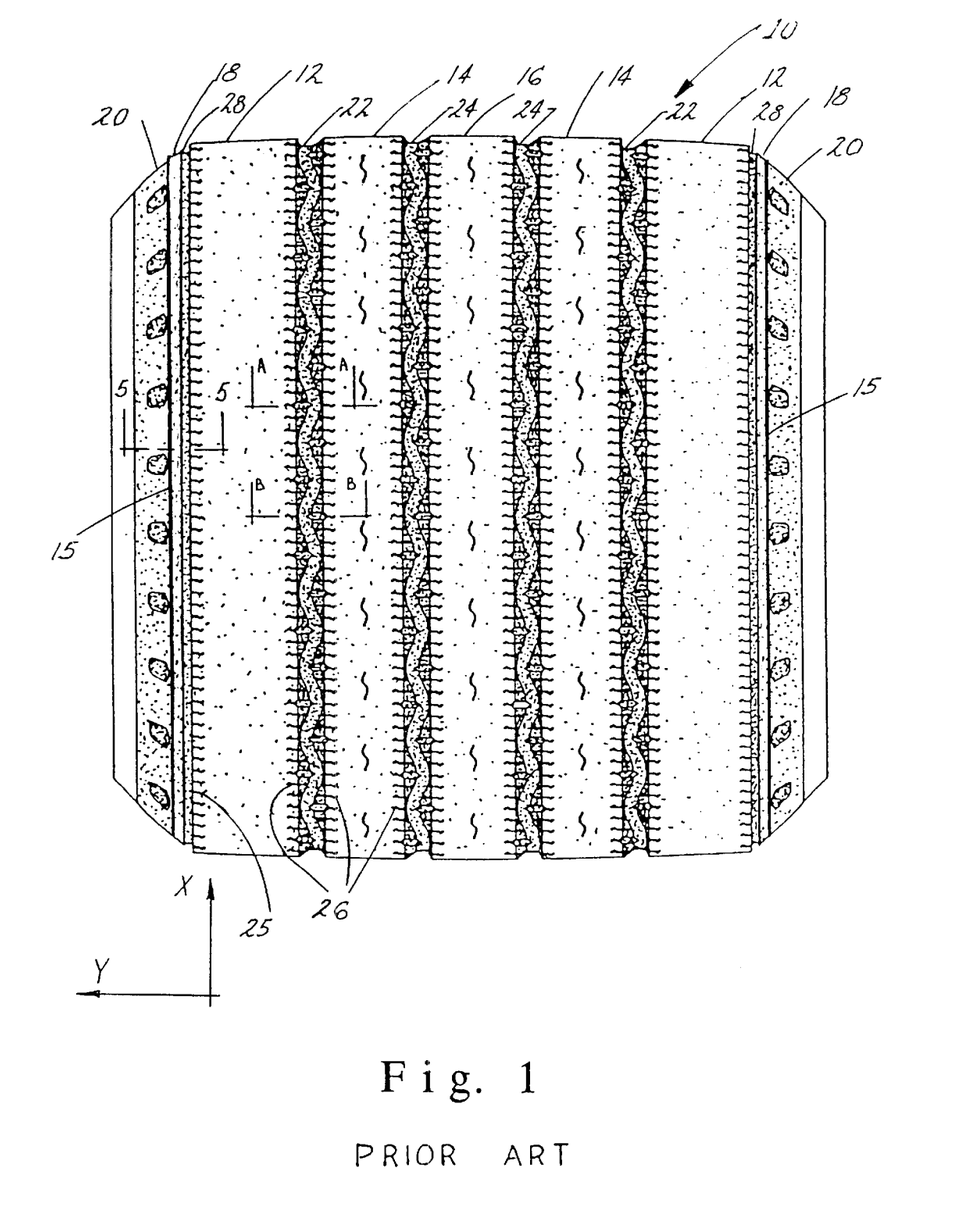
FIG. 1 is a fragmentary plan view of a conventional tire showing an existing tread pattern as a reference.

Another design feature known in the art to assist the tire tread in increasing tread life by reducing irregular wear is the addition of spaced apart sipes which extend laterally into the main ribs from the main grooves, as well as from the narrow shoulder grooves into the first interior ribs. This siping can be further enhanced by inclined sipes which are inclined in the depth direction from a normal line to the tread surface of the tire. Inclined siping is disclosed in Japanese Patent No. 5-338418 (JP418) and in AU983. In JP418 the inclined sipes are placed so that the sipes have an inner end which trails the surface end during forward rotation of the tire. This inclined sipe is used to lower rib rigidity. No siping is indicated adjacent the narrow shoulder end part 2 (FIG. 1). The inclined siping disclosed in AU983 is inclined at an angle to the normal line at the tread surface between 5 and 25 degrees. The siping of this reference is used in combination with a very wide shoulder rib as previously discussed.

In yet another design feature, known in the art to assists the tire tread to increase tread life by reducing irregular wear, the tread design controls the amount of normal load on the main ribs by the addition of a stepped rib which is placed adjacent to the rib or ribs to be protected. In the disclosure of US444, the stepped rib zones contact the ground within the main tread width land portion to help support the load of the tire. The total width of the stepped zones is in a range from 5 to 25 percent of the tread ground contact area and the stepped zones have a recess which is proportional to the load on the tire and the tread gage and inversely proportional to the tread contact area and the modulus of elasticity of the tread rubber. Recessed values of 2 millimeters or greater are used. Contact of the stepped zone with the ground is based on contact with at least 50 percent but less than 200 percent of the maximum load on the tire tread. Each stepped zone is inside the land portion of the tread and is limited by two narrow grooves or narrow cuts and the load supporting land portions encompass the full lateral width of the tire. The US444 disclosure is silent about the width of narrow grooves and cuts, and about the use of stepped zones at the lateral edges of the tire tread.

Another patent that discloses a tread design that controls the amount of normal load taken by a stepped rib which is placed adjacent to the rib or ribs to be protected is British Patent No. 532,534 (GB534). Grooves between the load bearing ribs have thinner ribs which are separated from the load bearing ribs by narrow grooves about 0.8 millimeters in width. The thinner ribs may be recessed but no values are given for the magnitude of the recesses. The GB534 patent is silent about recessed ribs on the lateral edges of the tread.

A need remains to have a shoulder rib which becomes a sacrificial rib that maintains contact with the ground surface to reduce the loads taken by the main tread width, especially the first interior rib. A means for maintaining a load on the shoulder ribs can effectively reduces the stresses on the main ribs of the steer axle truck tire during straight ahead driving. The need is to cause tread wear to be more uniform across the tire's tread. The first interior rib of the tread width on each lateral side of the tire is subjected to high loads which produce relatively high stresses which need to be reduced to improve the wear on this first interior rib to give regular or uniform wear.

Accordingly, an object of the present invention is to provide shoulder ribs outside both lateral edges of the main tread width which become sacrificial ribs by assuming a larger portion of the load on the tire for a longer period of the tire's tread life due to wear.

In particular, an object of the present invention is to teach the proper shape and dimensions of the sacrificial ribs and narrow shoulder grooves of a new truck tire so that the sacrificial ribs remain effective in protecting the main tread portion of the tire after tread wear is initiated.

A further object of the present invention is to provide lateral sacrificial shoulder ribs for truck tires for reducing the irregular wear on the first interior ribs. The sacrificial ribs are to help delay the onset of irregular wear of the main ribs and the growth thereof.

Another object of the present invention is to reduce the onset of irregular wear of steer axle truck tires during long haul operations. The onset or railway wear adjacent circumferential grooves is of particular concern.

Yet another object of the present invention is to construct a truck tire having a belt package, a carcass, bead areas and sidewalls that includes sacrificial ribs and narrow shoulder grooves to enhance the reduction in irregular wear of the main tread area of a tire which results in a uniform wear pattern across the main tire tread width.

SUMMARY OF THE INVENTION

The above objectives are accomplished according to the present invention by providing a tire with a sacrificial rib to protect the main ribs of the tire's tread by delaying the onset of irregular wear and the growth thereof.

In one embodiment of the present invention an improved tread for a heavy duty tire is provided. The tire has a carcass extending between spaced apart bead cores, a central crown area outside the carcass with a belt package for helping support the tread in contact with a supporting surface. The improvement comprises a plurality of main ribs formed by grooves extending generally circumferentially around an outer surface of the tire to form a main tread width for contacting the supporting surface. A sacrificial rib is provided for contacting the supporting surface at each lateral side of the main ribs. The sacrificial rib is a shoulder rib separated from the main ribs by a shoulder groove having a groove width not greater than about 1.5 millimeter. The sacrificial rib has a surface width in the range of about 2.5 percent to about 12 percent of said tread width. The sacrificial rib has a recess defined by a radial offset from a transverse profile of the main ribs. The offset has a value in the range of about 0.5 millimeter to about 2.0 millimeters when the tire is new. These improvements decrease irregular wear on the tire.

In another embodiment of the present invention a tire tread for a heavy duty truck tire is used on a steer axle of a vehicle driven in a long haul operation for improving tread wear. The tire tread comprises a main tread portion having at least four circumferential ribs over a main tread width separated by main grooves having a main groove depth extending around an outer surface of the tire between lateral edges of the main tread width. A surface of the main tread portion defines a lateral profile of said main tread. A pair of sacrificial ribs one at each lateral edge of said tread are separated from the tread width by a narrow shoulder groove adjacent each one of the lateral edges. Each sacrificial rib has a lateral surface width in a range of values between about 10 millimeters and about 17 millimeters. The narrow shoulder groove has a lateral width in a range of values between about 0.2 millimeter and about 1.5 millimeter and a narrow groove depth between about 90 percent to about 110 percent of the main groove depth. The narrow groove has an enlarged portion at a radially inward end of the narrow groove for reducing cracking at this radially inward end. The sacrificial rib has a surface area recessed radially inward of the tire defined by a radial offset from a uniform extension of the lateral profile. The offset has a value in the range of about 0.5 millimeter to about 1.5 millimeter, wherein tread wear of the truck tire is improved.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENTS

Figure 3:
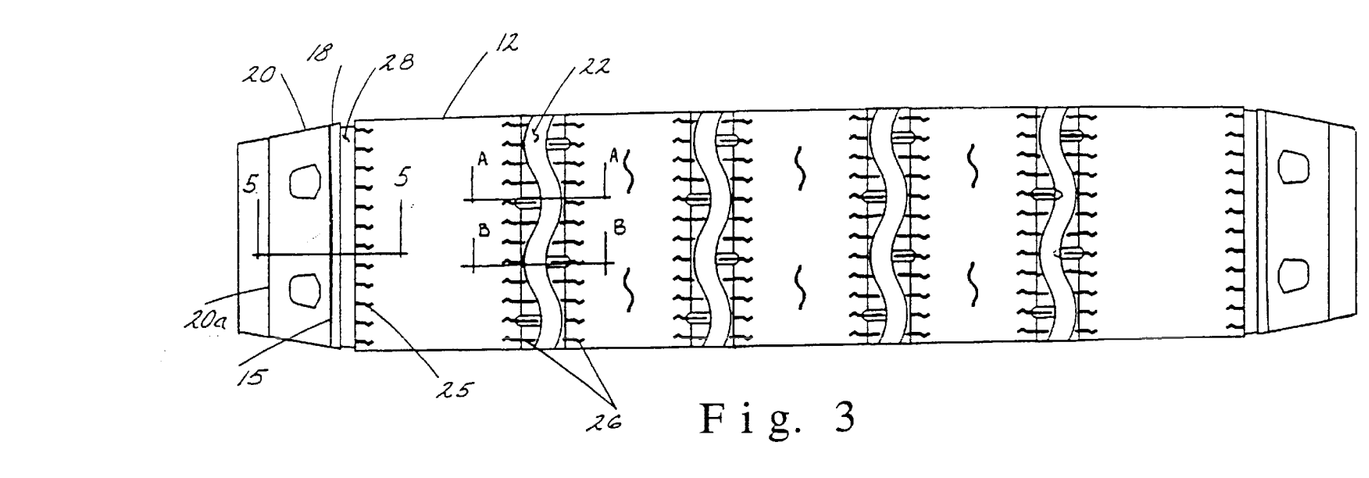
FIG. 3 is an enlarged segment of the reference tire of FIG. 1 showing tread details.
Figure 5:
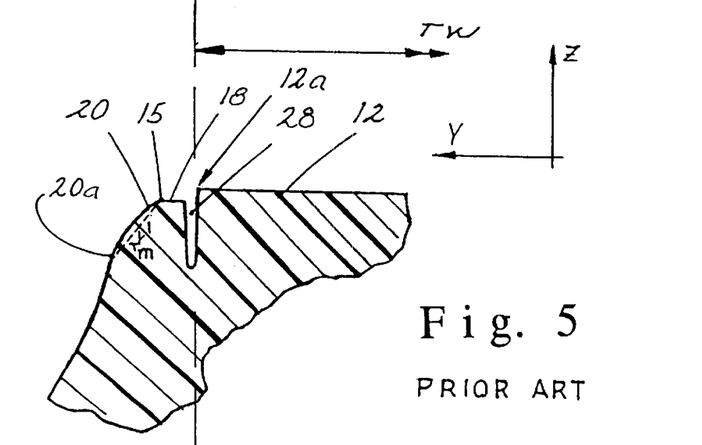
FIG. 5 is a radial cross-sectional view of the reference tire of FIG. 1 taken at a shoulder location along line 5—5.

Referring now in more detail to the drawings, the invention will now be described in more detail. The conventional or reference tire 10 illustrated in FIGS. 1, 3 and 5 has narrow shoulder ribs 18 defined by shoulder grooves 28 at the lateral edges of the main tread. The narrow shoulder ribs are recessed from the main tread portion having ribs 12, 14, and 16 defined by grooves 22, and 24. During normal running of the vehicle, the narrow ribs remain recessed during the life of the tire to maintain a sharp edge 12a on the first interior ribs 12. The overall normal running width of the tire tread is between lateral edges 15. The narrow ribs can collapse on the first interior ribs during maneuvers of the vehicle to support the first interior ribs. These narrow shoulder ribs typical of the art have a coupling effect with the first interior ribs to help maintain a flat lateral or transverse profile of the tire's tread surface. The narrow shoulder ribs wear at essentially the same rate as the main tread portion to maintain a stable radial recess or offset distance from the main tread profile. However, the stable offset value is relatively large and the stresses on the first interior ribs 12 can remain relatively large, especially after the tire has run for a relatively long period of time. The present invention fills a need to limit these stresses and it can remain throughout the life of the tire for improving the onset of irregular wear.

Figure 2:
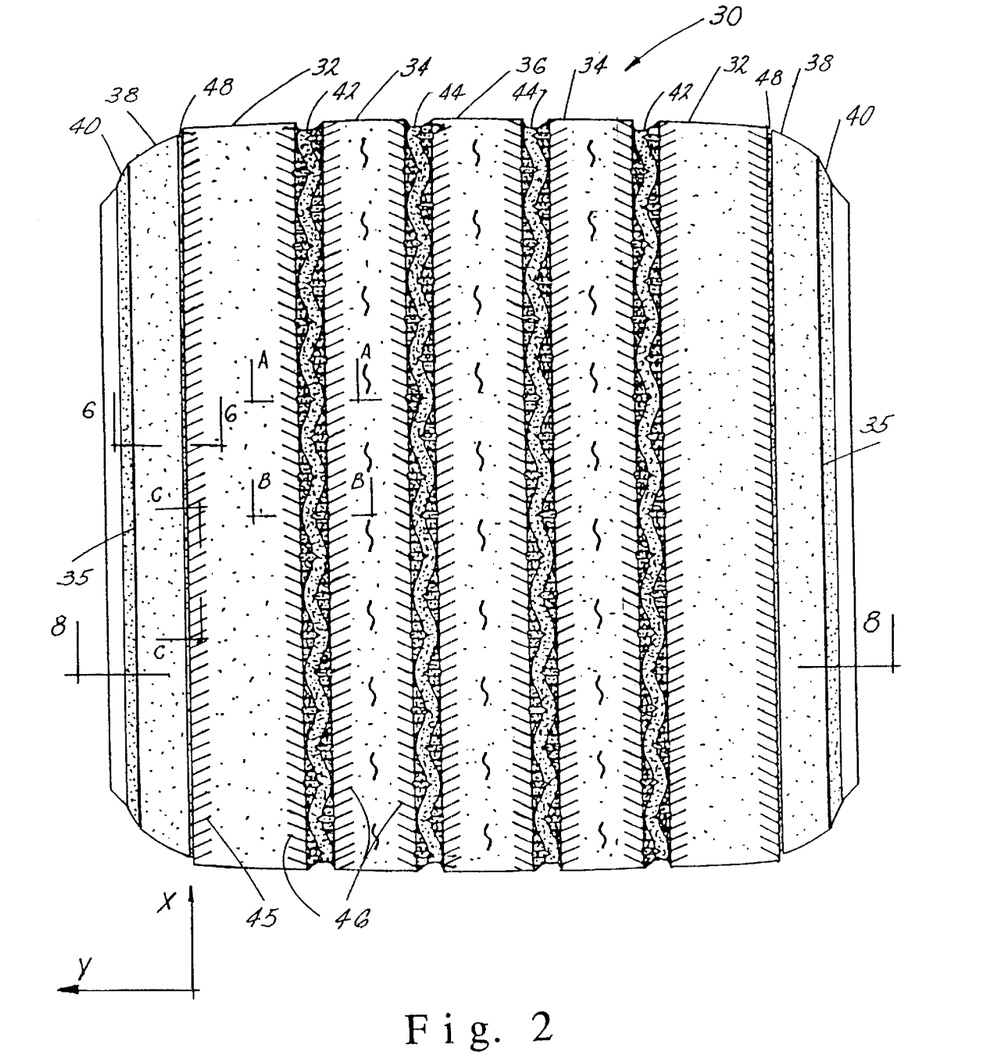
FIG. 2 is a fragmentary plan view of the tire of this invention showing a new tread pattern.
Figure 4:
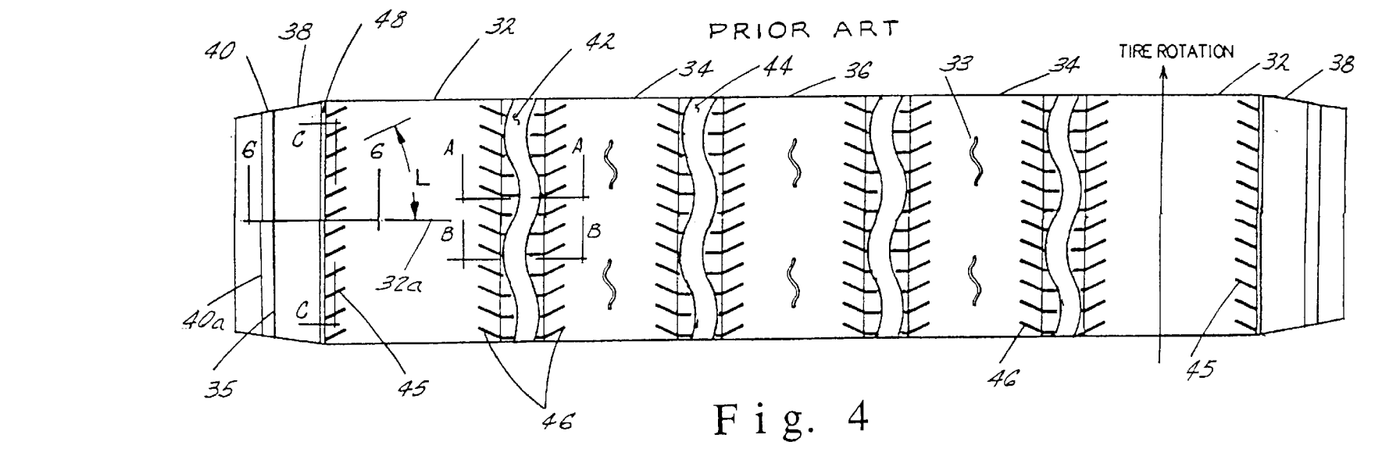
FIG. 4 is an enlarged segment of the tire of the invention showing tread details.
Figure 6:
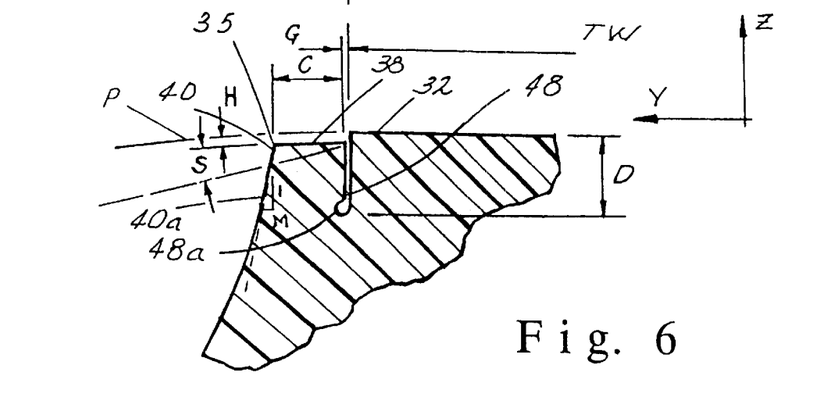
FIG. 6 is a radial cross-sectional view of the tire of the invention taken at a shoulder location along line 6—6 of FIG. 2.
Figure 8:
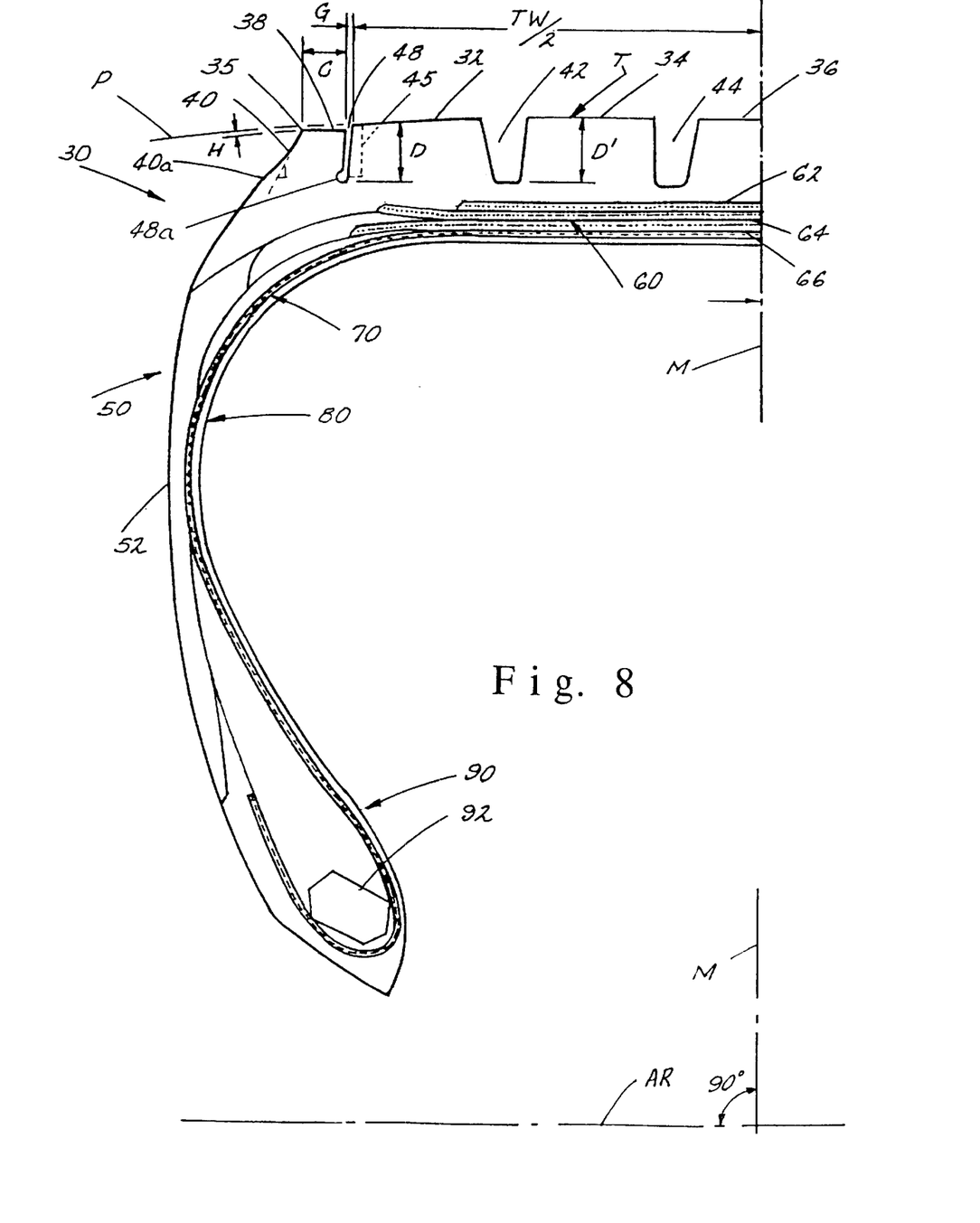
FIG. 8 is a radial cross-sectional view of the tire of this invention showing half of a symmetrical tire taken along line 8—8 of FIG. 2.

The tire 30 of this invention has sacrificial shoulder ribs 38 which are relatively wide as illustrated in FIGS. 2, 4 and 6. The sacrificial ribs are formed by relatively narrow shoulder grooves 48. The lateral width C of each sacrificial rib has a value between a range of values of about 2.5 percent to about 12 percent of the main tread width TW (FIG. 8). The preferred range of C values is between about 5 percent and about 10 percent. The lateral width of the sacrificial rib of a typical heavy duty truck tire has a value between about 5 millimeters to about 20 millimeters within the scope of this invention. The preferred surface width C of the sacrificial rib is in a range of about 10 millimeters to about 17 millimeters. The lateral width C of the sacrificial rib can vary between about 2.5 percent to about 12 percent of the main tread width of the tire's tread. The lateral width of the narrow shoulder groove can have a value as large as 1.5 millimeters within the scope of this invention. The width of the narrow shoulder groove 48 has a preferred width G value less than or equal to about 1.0 millimeters. In particular, the smaller width G values of about 0.2 millimeter to about 0.4 millimeter give optimum improvements in irregular tire wear. Practical values of the narrow shoulder groove width are in a range of about 0.2 millimeter to about 1.0 millimeter. However, groove cracking must be controlled.

The main tread portion is defined by ribs 32, 34 and 36 defined by circumferential grooves 42 and 44. The sacrificial rib has a minimum initial recess or radial offset radially inward the lateral or transverse profile line P of the main tread area of 0.5 millimeters (FIGS. 6 and 8). The initial recess H of the sacrificial rib radially inward of the main tread portion of a new truck tire is preferably in a range of about 1.0 millimeter to about 1.5 millimeters. The recess of an outer surface of the sacrificial rib from the profile line can vary within the scope of this invention. The top surface of the sacrificial rib can have an slope angle S with respect to the profile line with a value less than about 15 degrees. The recess is preferred at a constant distance H from the profile line P giving a slope angle of zero degrees (FIG. 6) with respect to the profile line. The zero slope angle helps the sacrificial rib assume a larger portion of the total tire load (see FIG. 6).

The normal overall contact width of the tire's tread extends between lateral edges 35. The tread width TW is defined as the lateral distance between the outer edges of the first interior ribs 32 (FIG. 8). The tread width is the main load supporting lateral width portion of the tire's tread. The ability of the sacrificial rib to help support the load on the tire is critical in extending the life of the tire by reducing the amount of irregular wear on the tire's tread.

Figure 6A:
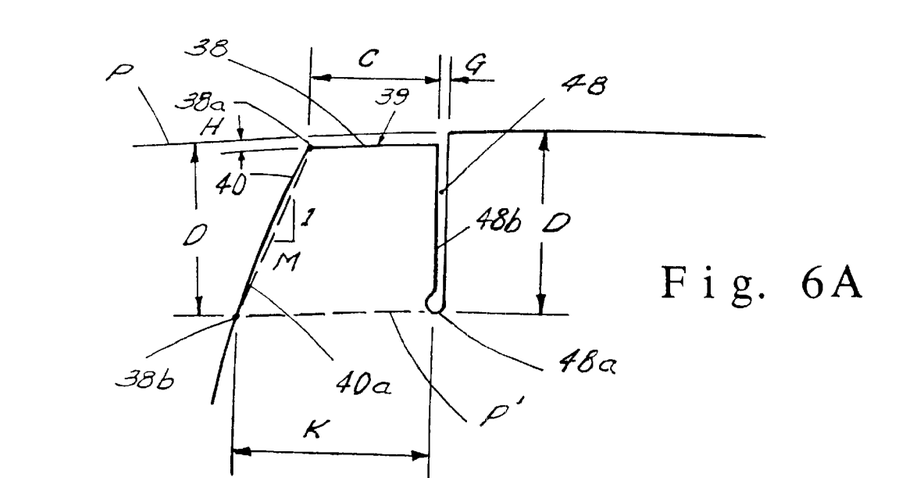
FIG. 6A is a radial cross-sectional view of the tire of the invention taken at a shoulder location along line 6—6 of FIG. 2 showing the geometry that defines the Shape Factor.

The shape of the shoulder area of the tire 30 is best defined by a shape factor which relates the surface width C, the slope M of the shoulder 40 and the depth D−H of the narrow shoulder groove 48 (FIG. 6). The slope M is further defined by referring to the illustration of FIG. 6A. A line P' is constructed parallel to the lateral profile line P from the bottom 48a of narrow shoulder groove 48 to intersect the outer surface 40 of the tire shoulder at a first point 38b of the sacrificial rib 38. The lateral distance K is defined from an axially outer sidewall 48b of the narrow shoulder groove to the first point. A second point 38a of the sacrificial rib is defined at the axially outer edge of the top surface 39 of the sacrificial rib. A sloping straight line 40a is constructed between the first point 38b and the second point 38a. A ratio of the axial extent of slope line 40a to the radial extent of the slope line is defined as slope M. That is, slope M is approximately equal to $(K-C)/(D-H)$. Typical slope values for the tire of this invention are in a range of values from about 0.1 to about 0.3.

The shape factor SF defined as $SF = M \times (D-H)/C$, along with the narrow groove width G, is a good indication of the ability of the shoulder configuration to protect the first interior rib. The depth D of the narrow shoulder groove is preferably between about 90 percent and 110 percent of the main groove depth D' (FIG. 8). The shape factor is such that the load on the tire is supported in a greater part by the sacrificial rib to relieve the stresses on the first interior rib. A typical shape factor SF for the tires made according to this invention has a value of about 0.05 to about 0.50 where a typical reference or convention tire would have a shape factor of about 1.0 or greater. The preferred value of the shape factor is about 0.2. The shape factors of the sacrificial rib of this invention is such that the load on the tire is supported in a greater part by the sacrificial rib to relieve the stresses on the first interior rib 32. In addition, the width of the narrow shoulder grooves 48 is such that the sacrificial ribs 38 contact the first interior ribs 32 during straight ahead driving to further support the normal and lateral loading on the tire.

Referring in more detail to FIGS. 4 and 6, the tire 30 of this invention has sacrificial ribs 38 that extend beyond the width TW of main tread area. The object is to protect and preserve the main tread area against irregular wear and the growth thereof during the life of the tire. As a result, shoulder ribs which are sacrificed to carry a larger portion of the tire load during a longer portion of the tire's life provide this protection. The shoulder ribs become sacrificial because they are more effective for a longer period of time during the life of the tire. They wear along with the tread width TW of the tire and the recess or radial offset depth H does not become excessive so that the sacrificial ribs continue to maintain contact with the supporting surface during straight ahead running of the vehicle.

The shoulder sacrificial ribs 38 are designed to relieve the main ribs of the tire tread from high stresses; particularly during straight ahead running. In addition, the sacrificial ribs of this invention have a geometric configuration that allows them to maintain their effectiveness during a longer portion of the life of the tire. This is achieved in by main structural features of the sacrificial rib. The first structural feature is the width C of the sacrificial rib being relatively large when compared with a major portion of the art. The second structural feature is the use of a slight recess H for the top surface of the sacrificial rib radially offset inwardly of the lateral profile line P of the main tread area (FIG. 6). These two structural features are uniquely chosen for the tire of this invention. A third structural feature that can be used is the slope M of the sidewall portion of the sacrificial rib. A fourth structural features of the invention is the narrow shoulder groove 48. This groove has a gap width G and a depth D selected to provide protection for the main tread area of the tire. The gap width is such that the sacrificial rib 38 will make contact with the first interior rib 32 when the tread surface is being loaded. The depth of the narrow shoulder groove, being between about 90 percent and 110 percent of the depth of the main grooves, allows the sacrificial rib 38 to act independently of the first interior rib 32 during the tread life of the tire. The relatively small gap width G, less than or equal to about 1.5 millimeters, can produce stress concentrations at the bottom of the narrow shoulder groove. Concentrated stresses can produce cracking in the tire's tread which may require the tire to be removed from service before tread wear becomes a problem. A minimum radius for the interior surface of the narrow shoulder grooves at the bottom of the grooves of about 1.0 millimeters can be provided to relieve stress concentrations at the bottom of the narrow shoulder grooves.

Figure 7A:
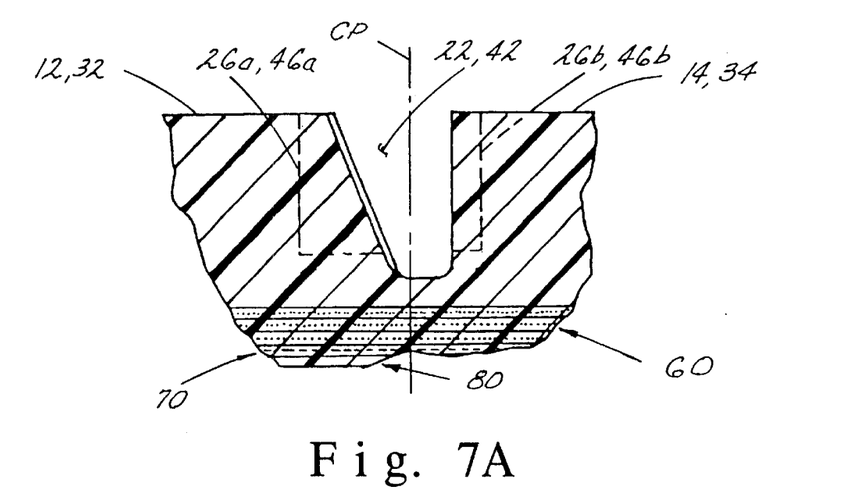
FIG. 7A is a radial cross-sectional view of either the reference tire or the tire of this invention taken at an interior main groove along line A—A of FIGS. 1, 2, 3 or 4.
Figure 7B:
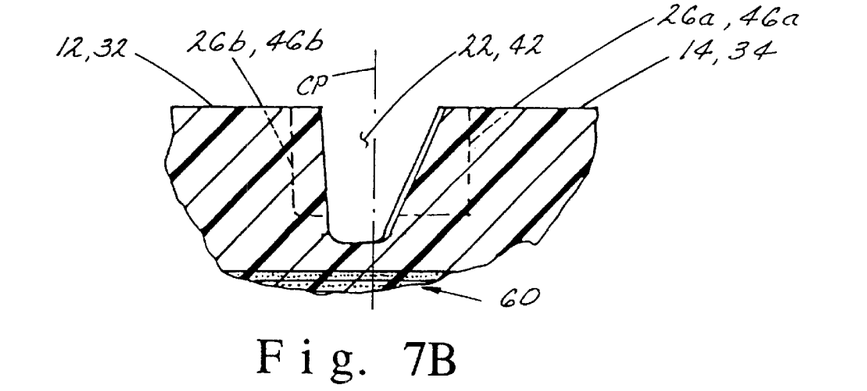
FIG. 7B is a radial cross-sectional view of either the reference tire or the tire of this invention taken at an interior main groove along line B—B of FIGS. 1, 2, 3 or 4.
Figure 7C:
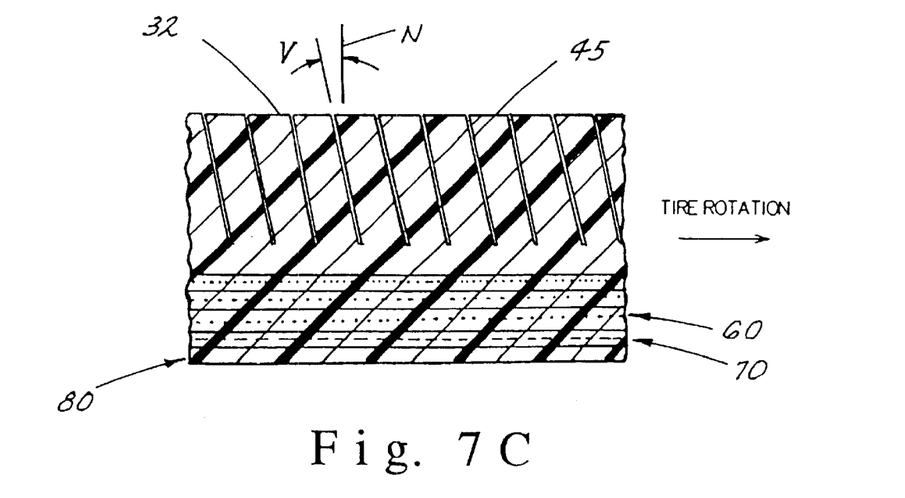
FIG. 7C is a circumferential cross-sectional view of a crown portion of the tire of this invention taken parallel to and near a narrow shoulder groove along line C—C in FIG. 2.

A further embodiment of the present invention includes the addition of siping at the lateral edges of each circumferential rib. This embodiment combines with the structural features of the sacrificial ribs and the narrow shoulder grooves to enhance the protection of the tire against onset of irregular wear and the growth thereof. Sipes 45 are provided for the outer edge of the first interior rib 32 adjacent the narrow shoulder groove 48, as illustrated in FIG. 4. Sipes 46 are provided for the main ribs 32, 34 and 36 adjacent the main grooves 42 and 44. The sipes 45 and 46 are disposed at an angle L with respect to a lateral line 32a. The siping extends in a direction from the grooves to correspond to the rotation of the tire as illustrated. The lateral angle L has a value in the range of about 15 degrees to about 35 degrees. Sipes 45 and 46 may also have an inclined angle V rearward with respect to a normal N to the tread surface, as illustrated in FIG. 7C. The incline angle V to the normal has a value in the range of 0 degrees to about 20 degrees. The preferred incline angle is about 5 degrees to about 15 degrees.

As a part of the present embodiment for edge siping, the preferred tire 30 has the same siping in all edges of the main ribs 32, 34 and 36 as illustrated in FIGS. 2 and 4. However, it is within the scope of this invention to have different siping for one rib when compared with another rib. The interior circumferential grooves 42 and 44 are made to be similar in the preferred embodiment of this invention. Preferred details of the interior grooves are illustrated by the cross-sectional views of FIGS. 7A and 7B. The bottom of the grooves can be formed in a sinusoidal pattern extending circumferentially around the tire (FIGS. 1 and 2). The outer surface edges of the grooves are preferably straight. Therefore, the radial side faces of the grooves have a varying angle with respect to a circumferential plane CP of the main grooves. The preferred sipes have an edge 46a, 46b within respective ribs which are parallel to the circumferential plane of the groove.

A cross-sectional view of an example of the tire of this invention is illustrated in FIG. 8. The tire 30 is symmetrical with respect to the midplane M of the tire so that only half of the tire can be shown in this radial cut section. The tire rotates about the rotational axis AR of the wheel of the vehicle. The tire includes the ribs and grooves of the tire tread T as previously discussed. Standard tread rubber materials can be used for the tire of this invention. The main tread width TW for the main contact surface area of the tire is protected against irregular wear by the sacrificial rib 38 and narrow shoulder groove 48 as disclosed. A belt package 60 below the tread has a plurality of belts 62, 64 and 66 for the tire illustrated. The belts are typically reinforced with parallel metallic cables crossed at an acute angle in each ply with the reinforcement of the adjacent ply. A carcass 70 extends below the belt from bead to bead 90 and encircles a bead core 92. The carcass has at least one carcass ply and preferably multiple plies reinforced with metallic cables extending generally radially and axially between bead cores. A sidewall area 50 having a sidewall rubber portion 52 extends between each bead and a respective lateral edge of the belt package 60. An innerliner ply 80 of a rubber material assists the tire to maintain an inflated condition on the wheel of the vehicle.

Figure 9:
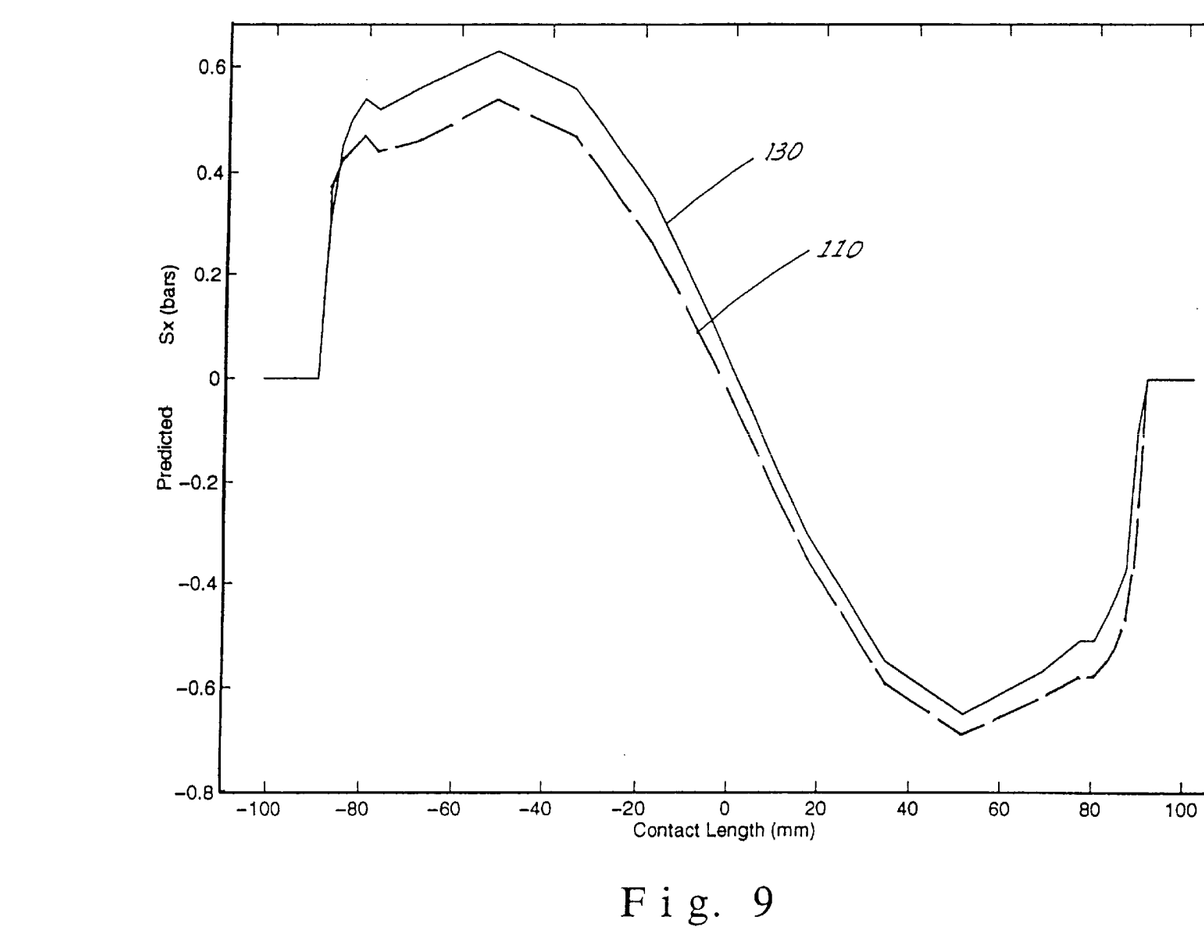
FIG. 9 is a graphical plot showing an average longitudinal stress distribution as a function of a contact length of a first interior rib of the tire of this invention and a conventional tire obtained using a finite element model, the rib being in loaded contact with a supporting surface.
Figure 10:
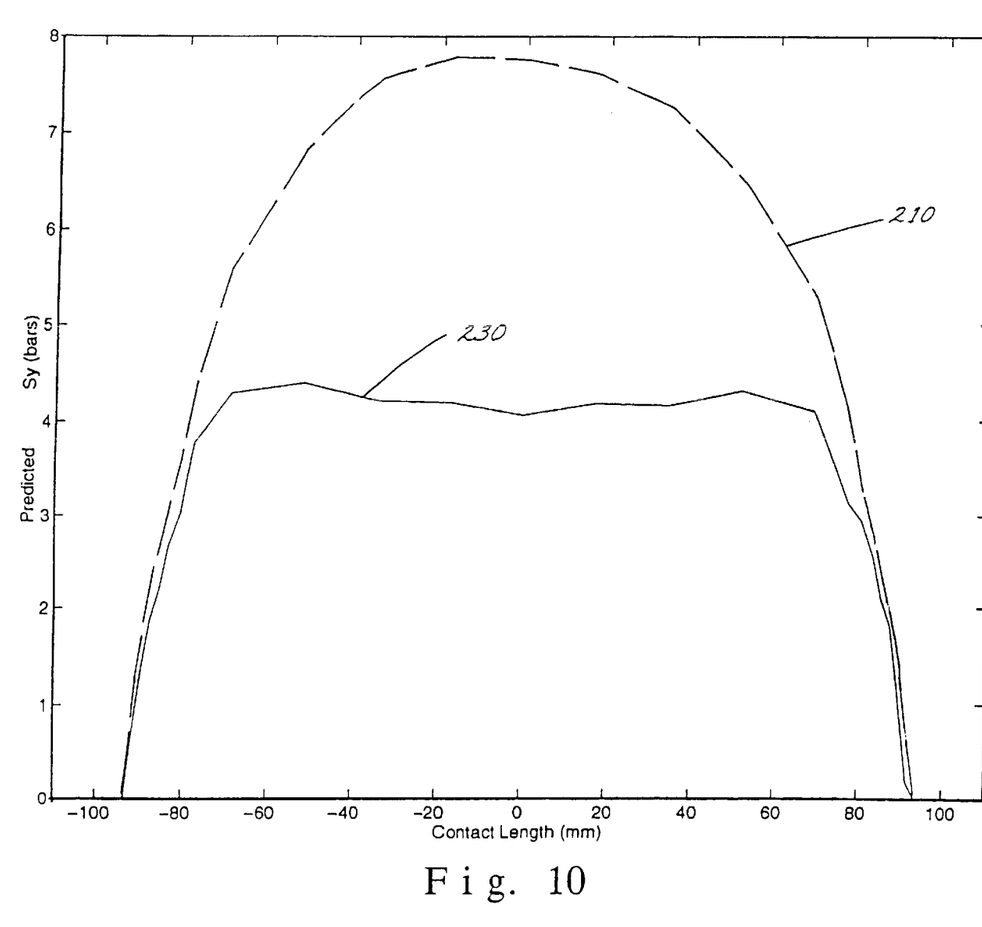
FIG. 10 is a graphical plot showing an average lateral stress distribution as a function of the contact length of a first interior rib of the tire of this invention and a conventional tire obtained using a finite element model, the rib being in loaded contact with a supporting surface.
Figure 11:
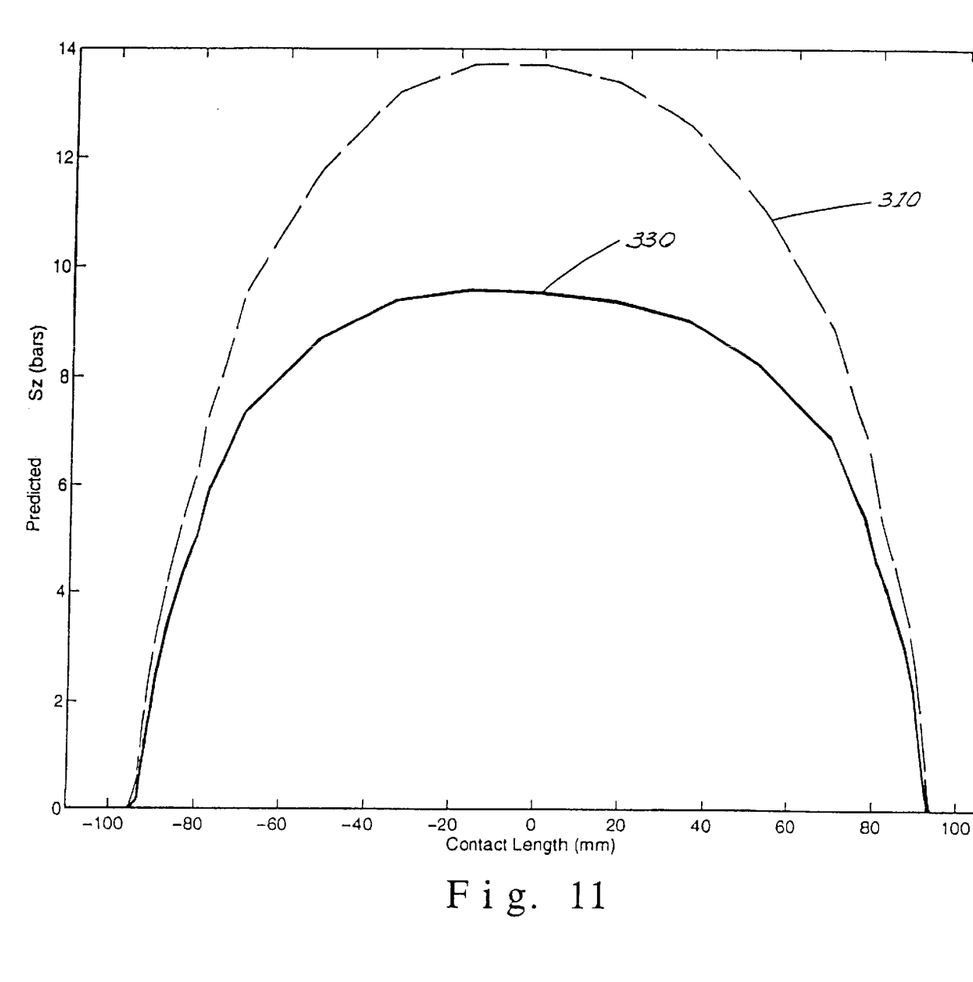
FIG. 11 is a graphical plot showing an average normal stress distribution as a function of the contact length of a first interior rib of the tire of this invention and a conventional tire obtained using a finite element model, the rib being in loaded contact with a supporting surface.

The reduction in stresses on the first interior ribs 32 of the preferred tire 30 of this invention are illustrated in the graphs of FIGS. 9, 10 and 11. The combined effect of the tire's architecture and materials can be modeled and analyzed using a high speed computer. The results for the stress Sx in a longitudinal X direction on the first interior rib are shown in FIG. 9. Longitudinal stresses Sx for the reference tire are shown as curve 110 and for the present invention are shown as curve 130. Stresses are plotted as widthwise average stress values across the rib as a function of the circumferential distance along the first interior rib contact length. The rib is in contact with a supporting surface and measurements are referenced from the center of the contact length (zero point). These longitudinal stresses show the reference tire and the invented tire to have approximately the same longitudinal stress Sx. The Sx stress also cause the driving forces to be increased for the tire of this invention.

The results for the stress Sy in a lateral Y direction on the first interior rib are shown in FIG. 10. Lateral stresses Sy for the reference tire 10 are shown as curve 210 and for the present invention are shown as curve 230. Stresses are plotted as widthwise average stress values across the rib as a function of the distance along the first interior rib contact length. The rib is in contact with a supporting surface and measurements are referenced from the center of the contact length (zero point). These lateral stresses show the present invented tire having lateral stresses Sy much lower than those for the reference tire.

The results for the stress Sz in a normal Z direction on the first interior rib are shown in FIG. 11. Normal stresses Sz for the reference tire 10 are shown as curve 310 and for the present invention are shown as curve 330. Stresses are plotted as widthwise average stress values across the rib as a function of the distance along the first interior rib contact length. The rib is in contact with a supporting surface and measurements are referenced from the center of the contact length (zero point). These normal stresses show the present invention tire 30 to have much less normal stresses Sx than the reference tire 10.

The combined stresses are computed to be much less for the tire of this invention. Actual test values can be compared with these computed stress values to further verify the improvements of the tire of this invention over the reference tire and others in the art. Actual wear test results are also disclosed in the experimental results section below to further verify the present computerized results of FIGS. 9, 10 and 11 showing improvements realized by the present invention.

The improvement in irregular wear is generally realized by the combination of a number of individual improvements. The widening of the width C of the sacrificial rib and adding a recess H for this rib gives a longitudinal stress Sx benefit for the first interior rib 32. Also, reducing the recess H from that used for the reference tire 10, the sacrificial rib 38 of the present invention tire 30 will wear less; making it beneficial over a longer period in the life of the tire. Reducing the gap distance G between the sacrificial rib 38 and the first interior rib 32 makes the ribs contact one another to help support the first interior rib and reduce the lateral stress Sy on the first interior rib. Because the sacrificial rib and the first interior rib essentially lock together when loaded, the rib edge effects are eliminated and the normal stress Sz on the first interior rib is improved. A general locking together provides a more sturdy sacrificial rib to add more endurance in high impact and scrubbing environments over the reference tire. The sacrificial ribs of the present invention tire tread initially wear at a slower rate than the narrow ribs of the reference tire because of their higher radial development (lower radial offset) which will make the sacrificial ribs remain beneficial longer in the life of the tire.

Experimental Results

A conventional or reference tire known in the art was tested along with a tire essentially the same as the conventional tire, but having the features of the present invention. The tires were heavy duty truck tires of the same 275/80 R22.5 size, load range and usage; as defined by the Standards of the 1997 Yearbook of The Tire and Rim Association, Inc. of Copley, Ohio.

There were two conventional tires and two tires of the invention tested on steer axles of two identical long haul vehicles and rotated between vehicles to compensate for any vehicle suspension system differences. The following results illustrate the improvements provided by the tire of this invention.

The conventional tire and the tire of this invention have essentially the same dimensions except for the geometry of the shoulder ribs and the narrow shoulder grooves (see FIG. 6). Table 1 shows the geometric parameters of the conventional tire and the tire of this invention. The depth of the narrow shoulder grooves are made equal to the depth of the grooves in the main tread width, or about 15 millimeters. Sipes were included in the lateral outer edge of the first interior ribs with the conventional tire having zero lateral and inclined angles and the tire of the invention had sipes with a lateral angle L of about 25 degrees (FIG. 4) and inclined angle V of about 10 degrees (FIG. 7C). The shape factor for the conventional tire was 0.81 and the tire of the invention had a shape factor of 0.22.

The tire testing continued until the tire wear on the conventional tires were of a magnitude to cause the tires to be removed from service. The right side tires were maintained on the right side of each vehicle when tires were rotated between vehicles. A number of rotations were used during the test period.

TABLE I

TEST TIRE SHOULDER GEOMETRY PARAMETER (mm)

| TIRE TESTED | TREAD WIDTH TW | SHOULDER RIB WIDTH C | RIB RECESS H | NARROW GROOVE WIDTH G | SLOPE M |
|---|---|---|---|---|---|
| CONVENTIONAL TIRE | 197 | 4.5 | 2.8 | 3.0 | 0.3 |
| TIRE OF INVENTION | 197 | 12.0 | 1.5 | 1.0 | 0.2 |

Table II illustrates the relative magnitude of wear for each of the ribs of right side tires and Table III illustrates the relative wear for each of the ribs of left side tires. Wear magnitudes are given relative to the outer first interior rib of the conventional tire. Relative mileage values at removal of the tire from service is also given in the last column.

TABLE II

RELATIVE MAXIMUM WEAR: RIGHT TIRE

| TEST TIRE | RIB 1 OUTER 1st Interior | RIB 2 2nd Interior | RIB 3 CENTER | RIB 4 2nd Interior | RIB 5 INNER 1st Interior | Relative Mileage at Removal |
|---|---|---|---|---|---|---|
| CONVENTIONAL TIRE | 1.0 (ref.) | 1.0 | 1.0 | 1.2 | 2.5 | 1.0 (ref.) |
| TIRE OF INVENTION | 1.5 | 1.5 | 1.5 | 1.5 | 1.7 | 1.0 |

TABLE III

RELATIVE MAXIMUM WEAR: LEFT TIRE

| TEST TIRE | RIB 1 OUTER 1st Interior | RIB 2 2nd Interior | RIB 3 CENTER | RIB 4 2nd Interior | RIB 5 INNER 1st Interior | Relative Mileage at Removal |
|---|---|---|---|---|---|---|
| CONVENTIONAL TIRE | 1.0 (ref.) | 0.4 | 0.3 | 0.4 | 0.4 | 1.0 (ref.) |
| TIRE OF INVENTION | 0.6 | 0.6 | 0.6 | 0.6 | 0.7 | 1.5 |

The relative wear test results of Tables II and III show a much more uniform wear pattern for the respective ribs of the tire of this invention. For the right side tires of the vehicle, the maximum wear was on the first interior rib on the inner side of the tire with respect to the vehicle. They were both removed from service at the same mileage, however, the wear on the tire of this invention was only 1.7/2.5×100=68 percent of that for the conventional tire. For the left side of the vehicle the maximum wear for the conventional tire was on the first interior rib at the outer side of the tire with respect to the vehicle. For the left tire of the invention, the maximum wear was on the inner side of tire as before. The left tire of this invention was removed from service at a mileage 1.5/1.0×100=50 percent greater than the mileage of the conventional tire, and the wear of the tire of the invention was only 0.7/1.0×100=70 percent of that for the conventional tire. These results illustrate the dramatic wear improvements of the tire of this invention.

Figure 13:
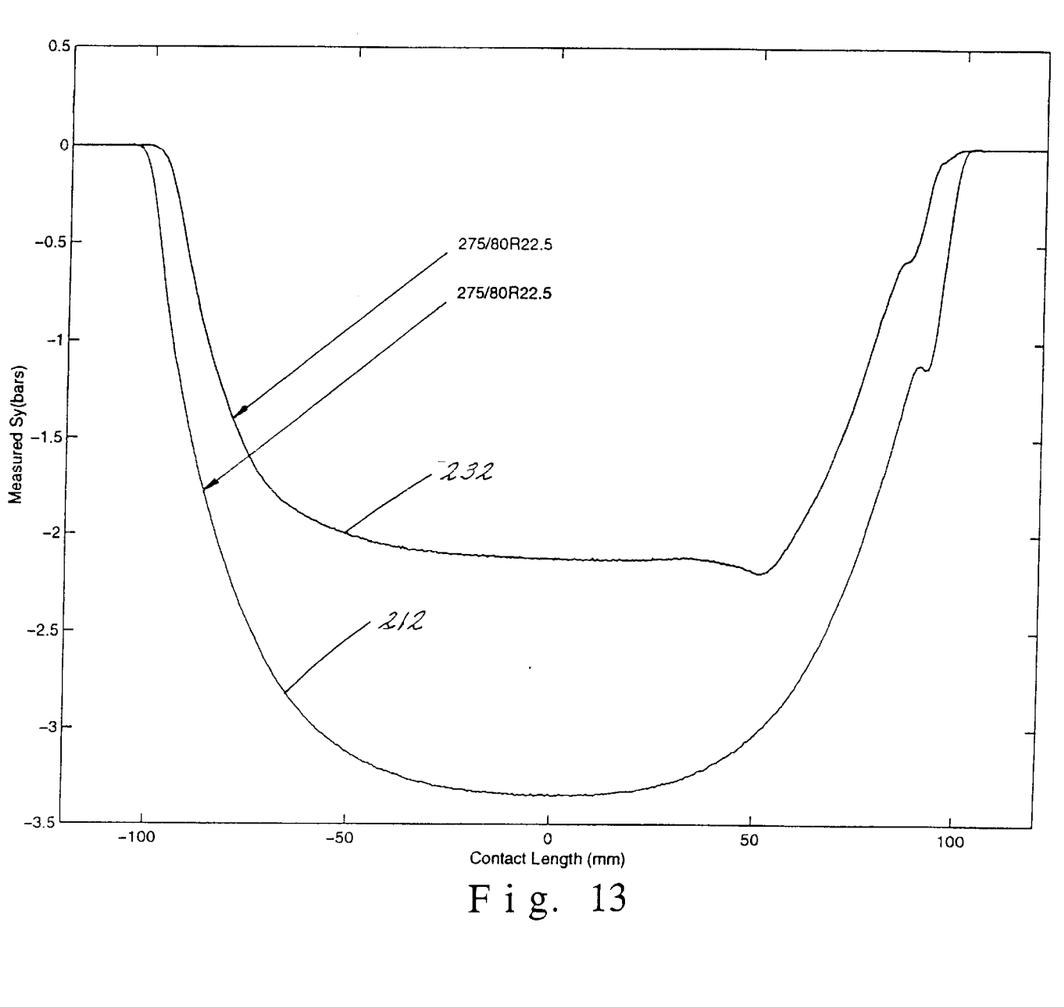
FIG. 13 is a graphical plot showing an average lateral stress distribution as a function of the contact length of a first interior rib of the tire of this invention and a conventional tire obtained by actual tire tests, the rib being in loaded contact with a supporting surface.
Figure 14:
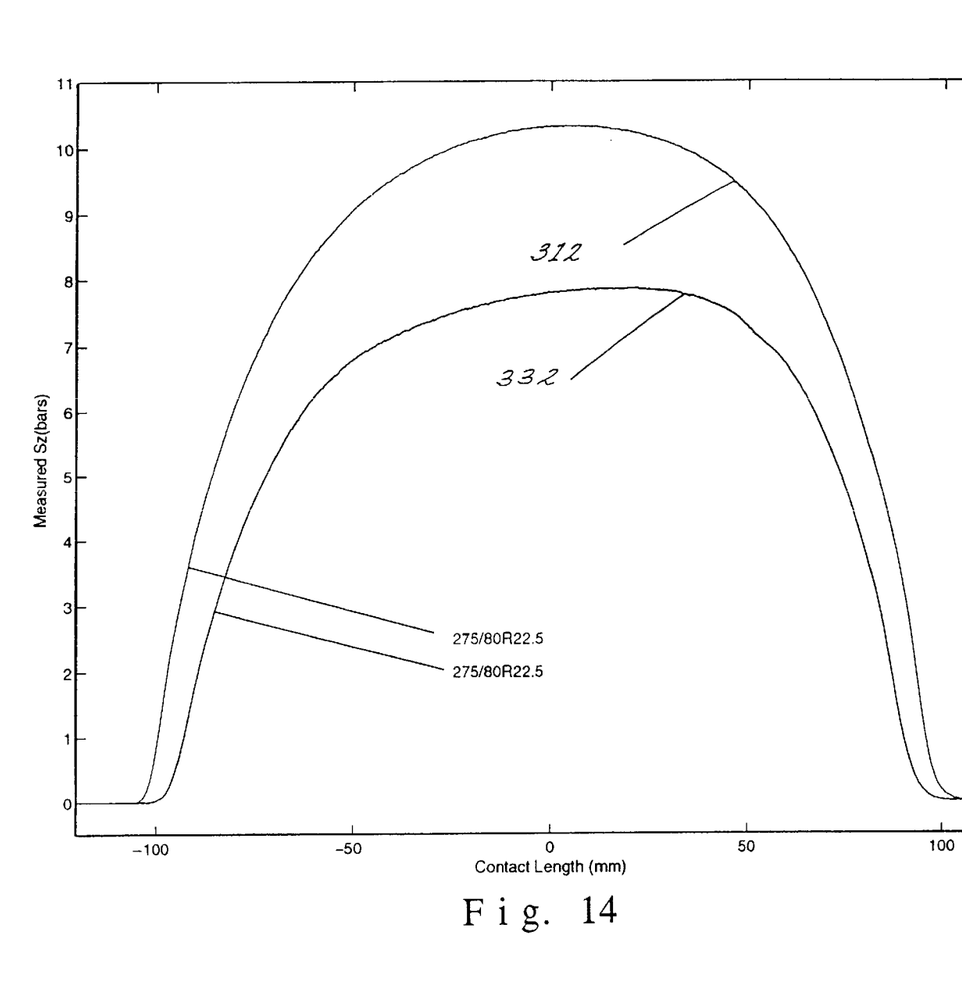
FIG. 14 is a graphical plot showing an average normal stress distribution as a function of the contact length of a first interior rib of the tire of this invention and a conventional tire obtained by actual tire tests, the rib being in loaded contact with a supporting surface.

Actual stress measurements were made for the test tires to compare with the predicted stresses using a finite element model (FEM) and a high speed computer. The stress results of the computerized model results were previously disclosed and discussed, as illustrated in graphs of FIGS. 9, 10 and 11. New graphs showing the relative maximum stresses on the first interior ribs resulting from actual test results are illustrated in FIGS. 12, 13 and 14.

Figure 12:
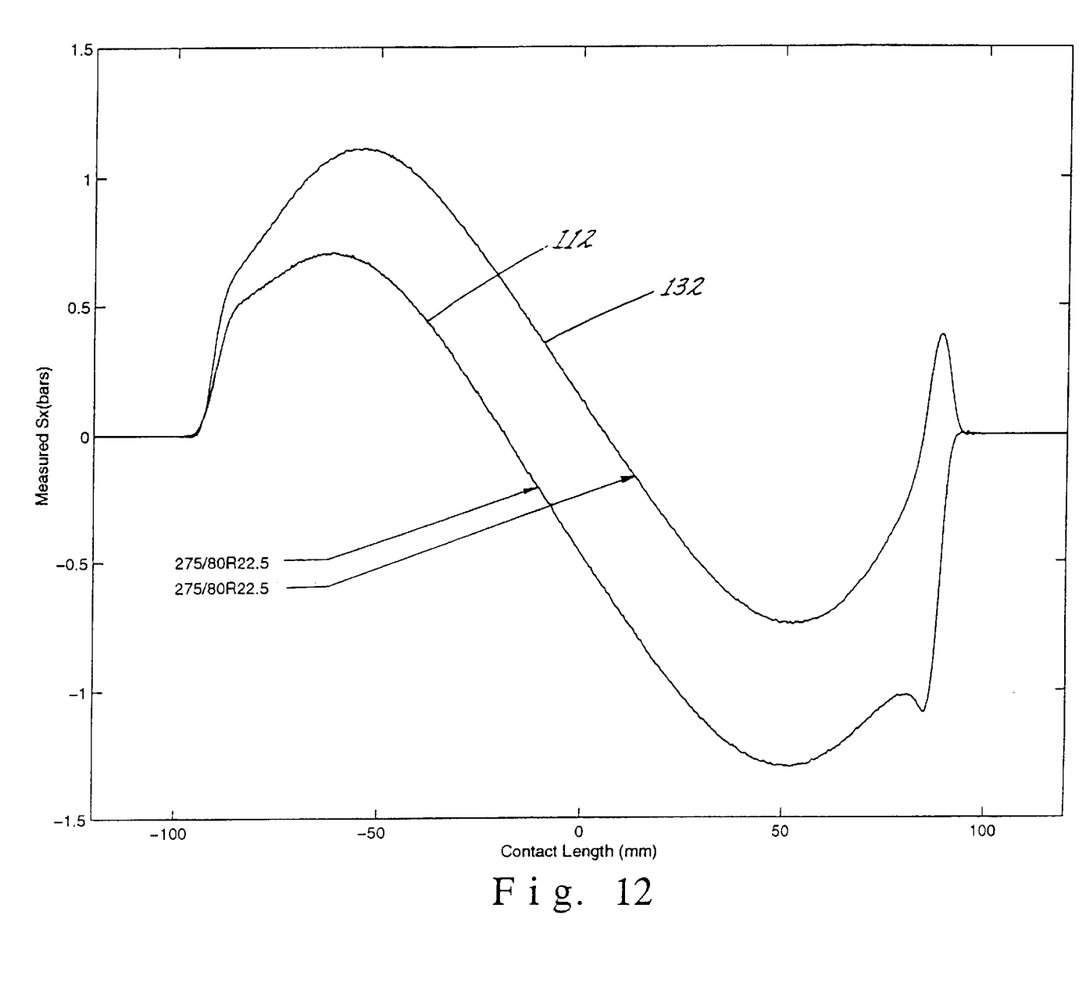
FIG. 12 is a graphical plot showing an average longitudinal stress distribution as a function of a contact length of a first interior rib of the tire of this invention and a conventional tire obtained by actual tire tests, the rib being in loaded contact with a supporting surface.

The actual test results for the stress Sx in a longitudinal X direction on the first interior rib are shown in FIG. 12. Longitudinal stresses Sx for the conventional tire are shown as curve 112 and for the present invention are shown as curve 132. The actual test results for the stress Sy in a lateral Y direction on the first interior rib are shown in FIG. 13. Lateral stresses Sy for the conventional tire are shown as curve 212 and for the present invention are shown as curve 232. The actual test results for the stress Sz in a normal Z direction on the first interior rib are shown in FIG. 14. Normal stresses Sz for the conventional tire are shown as curve 312 and for the present invention are shown as curve 332. The general comments previously made about the FEM computer generated stresses generally apply to the stresses obtained by actual test results. In fact, the graphs are quite similar. Table IV shows a comparison between the relative maximum stress on the first interior ribs for the conventional tire compared with the tire of this invention for stresses Sx, Sy and Sz, in each case.

TABLE IV

RELATIVE MAXIMUM STRESSES ON FIRST INTERIOR RIBS

| | PREDICTED (FEM) | | | ACTUAL (TESTS) | | |
|---|---|---|---|---|---|---|
| TIRE | Sx | Sy | Sz | Sx | Sy | Sz |
| CONVENTIONAL TIRE | 1.0 (ref.) | 1.0 (ref.) | 1.0 (ref.) | 1.0 (ref.) | 1.0 (ref.) | 1.0 (ref.) |
| TIRE OF INVENTION | 0.86 | 0.60 | 0.70 | 0.58 | 0.59 | 0.71 |

In all cases the maximum stresses are less on the tire of this invention than the stresses on the conventional tire. The same general magnitude reductions in Sx, Sy and Sz are noted for the tire of this invention when compared with the conventional tire in both comparisons. The normal stresses Sz are essential in controlling the wear on the first interior ribs of the tire. These test results verify the value of the sacrificial ribs of this invention in reducing wear and extending the useful life of the tire.

While a preferred embodiment of the invention has been described using specific terms, such description is for illustrative purposes only, and it is to be understood that changes and variations may be made without departing from the spirit or scope of the following claims.

What is claimed is:

1. A heavy duty tire, said tire having a tread, a carcass extending between spaced apart bead cores, a central crown area outside said carcass with a belt package for helping support said tread in contact with a supporting surface, wherein said tread comprises:

a plurality of main ribs formed by main tread grooves extending generally circumferentially around an outer surface of the tire to form a main tread width over a tread surface for contacting the supporting surface;

a sacrificial rib for contacting the supporting surface at each lateral side of the main tread width, said sacrificial rib separated from said main ribs by a narrow shoulder groove having a groove width such that said sacrificial rib contacts a first interior rib during straight ahead driving of a loaded tire;

each of said sacrificial ribs has a surface width in the range of about 2.5 percent to about 12 percent of said tread width;

each of said sacrificial ribs has an outer surface recessed from a transverse profile of said main ribs by a radial offset, said radial offset having a value in the range of about 0.5 millimeter to about 2.0 millimeters when the tire is new; and the edge of said main rib adjacent to each of said narrow shoulder grooves has a plurality of sipes extending horizontally from said narrow shoulder groove in a direction corresponding to the rotation direction of the tire at a lateral angle of about 15 degrees to 35 degrees and extending vertically at an angle inclined rearward from an outward normal to said tread surface of about 5 degrees to about 15 degrees.

2. The tire set forth in claim 1 wherein said sacrificial rib has a surface width in the range of about 5 percent to about 10 percent of said main tread width.

3. The tire set forth in claim 1 wherein said sacrificial rib has a surface width with a value in the range of about 10 millimeters to about 17 millimeters.

4. The tire set forth in claim 1 wherein said radial offset from the transverse profile has a value in a range of about 1.0 millimeters to about 1.5 millimeters.

5. The tire set forth in claim 1 wherein said groove width of said narrow shoulder groove has a value in a range of about 0.2 millimeters to about 1.5 millimeters.

6. The tire set forth in claim 5 wherein said shoulder groove has a groove depth in a range of values of about 90 percent to about 110 percent of a depth of the said main tread grooves, said groove depth measured radially from said tread surface of said main ribs.

7. The tire set forth in claim 1 wherein said groove width of said narrow shoulder groove is not greater than about 1.0 millimeters.

8. The tire set forth in claim 1 wherein said width of said narrow shoulder groove has a value in the range of about 0.2 millimeter to about 1.0 millimeter.

9. The tire set forth in claim 8 wherein said width of said narrow shoulder groove has a value in the range of about 0.2 millimeter to about 0.4 millimeter.

10. The tire set forth in claim 1 wherein said sacrificial rib has a shape factor (SF) defined as a depth (D–H) of said narrow shoulder groove times a slope (M) of an outer shoulder of said sacrificial rib divided by a lateral surface width (C) expressed as $$SF=(D-H) \times M/C$$

having a value of about 0.05 to about 0.50.

11. The set forth in claim 10 wherein said shape factor (SF) of said sacrificial rib has a value of about 0.2.

12. A tire for a heavy duty truck, said tire having a tread comprising:

a main tread portion having at least four circumferential ribs including first interior ribs over a main tread width separated by main grooves having a main groove depth extending around an outer surface of the tire between lateral edges of said main tread width, wherein a tread surface of said main tread portion defines a lateral profile of said main tread;

a pair of sacrificial ribs, one at each lateral edge of said tread separated from said first interior ribs by a narrow shoulder groove adjacent each one of said lateral edges;

each sacrificial rib having a lateral surface width in a range of values between about 10 millimeters and about 17 millimeters;

each of said narrow shoulder grooves has a lateral width in a range of values between about 0.2 millimeter and about 1.5 millimeter and a narrow groove depth between about 90 percent to about 110 percent of said main groove depth;

each of said sacrificial ribs has a surface area recessed radially inward of the tire defined by a radial offset from a uniform extension of said lateral profile, said offset having a value in the range of about 0.5 millimeter to about 1.5 millimeter, and the lateral edges of each of said main ribs have a plurality of sipes extending horizontally in a direction corresponding to the rotation direction of the tire at a lateral angle of about 15 degrees to 35 degrees and extending vertically at an angle inclined rearward from an outward normal to said tread surface of about 5 degrees to about 15 degrees.

13. The tire of claim 12 wherein said lateral width of said narrow shoulder grooves is not greater than about 1.0 millimeters.

14. The tire set forth in claim 12 wherein said sacrificial rib has a shape factor (SF) defined as a depth (D–H) of said narrow shoulder groove times a slope (M) of an outer shoulder of said sacrificial rib divided by a lateral surface width (C) expressed as $$SF=(D-H) \times M/C$$

having a value of about 0.05 to about 0.50.

15. The tire of claim 12 wherein said surface area of said sacrificial rib is a radially inward sloping surface from said lateral profile having said radial offset at said narrow shoulder groove and a slope angle with a value less than about 15 degrees.

16. The tire of claim 15 wherein said slope angle is zero degrees providing a constant radial offset from said lateral profile.

* * * * *